United States Patent [19]

Mahr

[11] Patent Number: 5,001,003

[45] Date of Patent: Mar. 19, 1991

[54] LAMINATED SAILCLOTH WITH SCRIM

[75] Inventor: Peter F. Mahr, Weston, Conn.

[73] Assignee: North Sails Group, Inc., Milford, Conn.

[21] Appl. No.: 233,204

[22] Filed: Aug. 17, 1988

[51] Int. Cl.⁵ .............................................. B63H 9/04
[52] U.S. Cl. .................................... 428/247; 428/113; 428/252; 428/255; 114/103
[58] Field of Search .............. 428/224, 232, 246, 247, 428/252, 284, 292, 294, 295, 255, 297, 298, 113; 114/103

[56]  References Cited

U.S. PATENT DOCUMENTS

| 912,950 | 2/1909 | Gibert | 428/247 |
| 3,644,165 | 2/1972 | Chen | 428/110 |
| 4,679,519 | 7/1987 | Linville | 428/246 |

Primary Examiner—George F. Lesmes
Assistant Examiner—Beverly A. Pawlikowski
Attorney, Agent, or Firm—Juettner Pyle Lloyd & Verbeck

[57]  ABSTRACT

A laminated sail cloth includes a central layer of spaced intersecting scrim yarns which intersect at acute angles in such a matter to reinforce the fabric along the fill and bias directions of the fabric.

6 Claims, 1 Drawing Sheet

LAMINATED SAILCLOTH WITH SCRIM

BACKGROUND OF THE INVENTION

This invention relates to fabrics useful for making sails for sailing vessels and more particularly to a laminated sail fabric having a central layer of scrim arranged in a particular fashion.

The art of sailmaking has evolved toward the use of special materials and sail panel designs that allow the sail to maintain an optimum shape under variable wind conditions and various angles of trim.

In order to provide the desired properties in a woven cloth, high tensile strength yarns may be employed, and it is also known to laminate a film, such as a polyester film, to the cloth. Another possibility is to use a laminate of fine and coarse woven cloths, as described in U.S. Pat. No. 4,554,205. The ability to increase strength and stretch resistance of a sail material is often limited by other practical considerations such as weight, stiffness and tear resistance.

More recently, some woven sailcloths have been made from high strength aramid or "KEVLAR" yarns running in the warp direction and polyester or "DACRON" yarns in the fill direction. Due to the nature of the weaving process and the relative strength of the materials, the warp or machine direction yarns bend or crimp the fill yarns. As a result, the material may stretch and distort in a direction parallel and on a bias to the fill yarns. This weakness may be partly minimized by cutting the sail panels in such a fashion that the warp yarns are aligned with and carry the maximum load generated in the sail.

A recent proposal for a sailcloth may be found in U.S. Pat. No. 4,444,822. This patent discloses a warp knit scrim laminated to a plastic sheet. In use, the material would be cut into panels with the warp yarns aligned with the direction of maximum load, such as disclosed in British patent no. 892,528 or U.S. Pat. No. 3,954,076.

In the use of a film laminated to a cloth or scrim, however, several problems arise Under the current theories, it is not necessary to have stretch resistance on the bias if the panels are installed as previously described. In practice, however, considerable stress is applied along the bias and fill as the sail configuration is changed and also during tacking.

A second problem with the use of film is the resulting stiffness of the material. For example, a laminate having a film of 6 to 8 mils would be desirable to prevent excessive stretch, but the stiffness would be too great to allow proper adjustment to the shape of the sail.

In view of the foregoing, it would be desirable to provide a sail fabric having a relatively thin film layer which is additionally reinforced in the fill or bias direction.

SUMMARY OF THE INVENTION

In accordance with the present invention, a laminated sail material includes a scrim of intersecting lines of yarns. The yarns of the scrim intersect at acute angles, and the scrim is laminated between various combinations of film and cloth. The scrim is arranged such that a line bisecting adjacent or coterminal acute angles is parallel to the fill or cross machine direction of the sail fabric. The scrim yarns provide strength, integrity and stretch resistance to the sail material in the fill direction and along the bias relative thereto without contribution of excessive weight to the sail material. Also, the scrim as described allows thinner layers of film to be employed.

THE DRAWING

DESCRIPTION OF THE PREFERRED EMBODIMENTS

Figure 1:
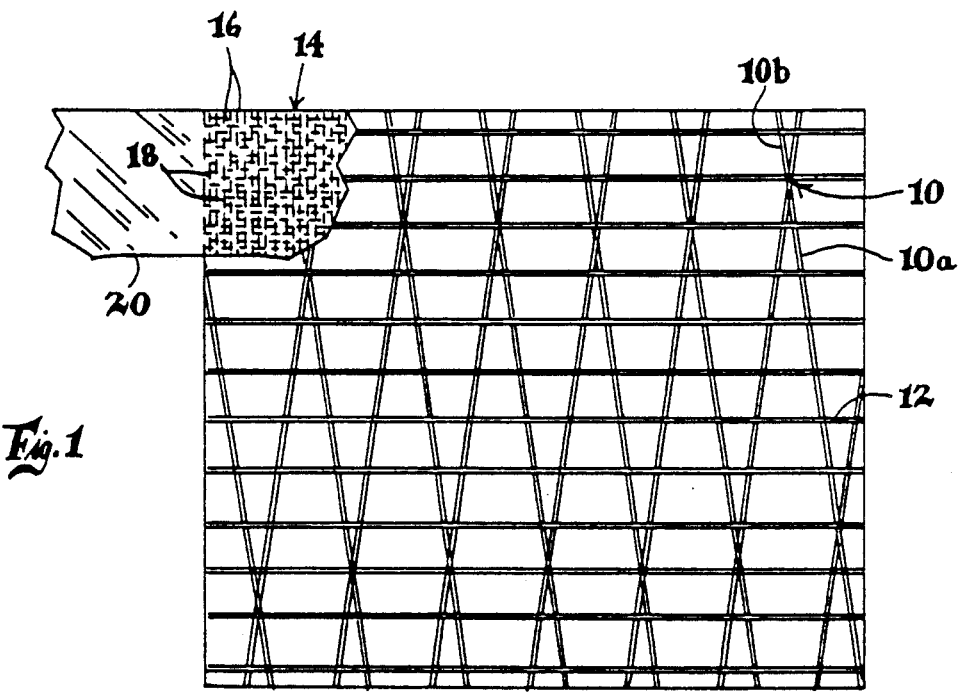
FIG. 1 is a plan view of the sail fabric of the present invention comprising an upper transparent film layer, an intermediate scrim layer, and a lower cloth layer, with portions being broken away to reveal details of the laminate.
Figure 2:
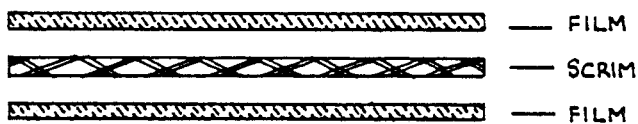
FIG. 2 through 5 are schematic cross sectional representations of alternative laminated sail fabrics of the present invention.
Figure 3:

As shown in FIG. 1, the sail fabric material of the present invention comprises a laminate of at least three plies, with a central ply being a scrim 10 as shown in FIG. 1. The scrim 10 comprises two sets of spaced parallel straight yarns 10a and 10b which intersect each other in a common plane and at an angle to form a grid. The yarns 10a and 10b do not intersect each other at right angles but rather at acute and obtuse angles as herein defined.

The scrim 10 is furnished as a separate component with the yarns 10a and 10b being joined together at their intersections with adhesive. In addition, a plurality of spaced warp yarns 12 may be adhered to the grid of the scrim to provide a stable net in sheet form, which is shape-retaining to facilitate handling prior to the lamination procedure. In the preferred embodiment, the scrim yarns 10a and 10b are composed of relatively high strength fibers such as aramid or polyester.

As shown in FIG. 1, one outer ply of the laminate may comprise a woven cloth 14 having warp yarns 18 and fill yarns 16. To provide maximum strength in the warp direction, i.e., in a direction substantially parallel to the warp yarns, the warp yarns may be composed of a high tensile strength material such as aramid, and the fill yarns 18 may be composed of a weaker polymeric material such as polyester. The other outer ply may be composed of a continuous polymer film 20 as shown, which in the present case, is a film of transparent polyester.

The three layers are laminated together by conventional methods, preferably with the use of thermosetting adhesives and the application of heat and pressure, such as by passing the laminated plies through the nip of a pair of heated rollers. Solvent based and catalyst cured adhesives, may also be employed.

As shown, the respective sets of parallel scrim yarns intersect at an acute angle such that lines which bisect coterminal acute angles are parallel to the fill yarns 16 of the woven material and perpendicular to the warp yarns 18 and 12. Thus, the scrim does not reinforce the sail fabric substantially in the warp direction but rather in the fill direction and along acute angles relative thereto. In the preferred embodiment, in order to provide maximum strength in the fill and bias direction, the acute angle at the intersection of the scrim yarns 10a and 10b are in the order of from about 5 to about 82 degrees.

In the preferred embodiment of the present invention, the woven cloth employed will have a warp yarn count in the order of about 15 to about 60 per inch, and the yarn count of the scrim will be in the order of about 0.5 to about 3 per inch, and preferably a ratio of about 40 to 60 warp per one scrim. The total thickness of the film layer or layers is preferably less than 3 mils to avoid excessive stiffness in the final fabric. The yarns of the scrim are essentially inextensible except by stretching of the yarns themselves in tension, since the yarns are nonwoven.

Figure 4:
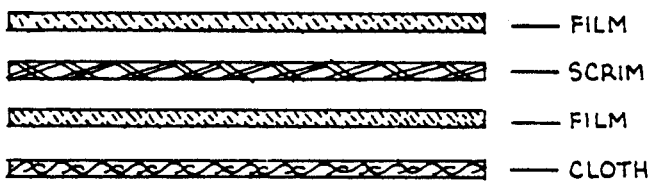
Figure 5:
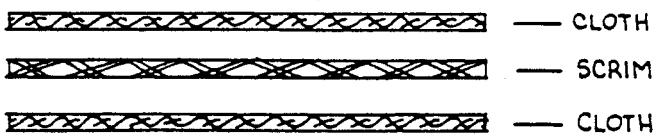

FIGS. 2 through 5 are schematic representations of other types of sailcloth laminates which may utilize the scrim as defined herein. In all cases, there is a layer of film or cloth on both sides of the scrim layer. In all cases, the scrim is arranged such that a central line passing through adjoining acute angles will be substantially parallel to the direction of the fill, or a direction across the machine on which the material is made. As shown in FIG. 4, for example, the outer layers may include additional layers of film or cloth.

The sail fabric of the present invention, after assembly and lamination, is wound up into rolls, and panels may be cut in order to assemble a sail. The panels in the sail would be arranged in a conventional fashion and preferably such that the lines of greatest tension or force generated in the sail are substantially aligned with the warp direction of the cloth, with the scrim providing reinforcement along the fill and bias directions.

I claim:

1. A sail fabric comprising a laminate of at least three layers, a central layer of said laminate being composed of a scrim comprising a pair of sets of spaced parallel yarns intersecting each other at acute angles relative to the cross machine direction of the machine on which the scrim is made to define a grid pattern, the outer layers being selected from film and cloth wherein said cloth comprises warp yarns and fill yarns, wherein lines bisecting acute angles are substantially parallel to the direction of said fill yarns and said cross machine direction, with said scrim yarns supporting said fabric in the cross machine direction and in the fill and bias directions, and adhesive means between said outer layers for securing the layers together and holding said sets of scrim yarns in said intersecting configuration.

2. The sail fabric of claim 1 wherein said acute angles are in the order of from about 5 to about 82 degrees.

3. The sail fabric of claim 1 wherein said scrim yarns are composed of aramid.

4. The sail fabric of claim 1 wherein said warp yarns are composed of aramid.

5. The sail fabric of claim 1 wherein said film is composed of polyester.

6. The sail fabric of claim 1 wherein one of the outer layers comprises cloth and the other outer layer comprises film.

* * * * *